United States Patent [19]

Okita et al.

[11] Patent Number: 4,651,108

[45] Date of Patent: Mar. 17, 1987

[54] DEMODULATION CIRCUIT HAVING MEANS FOR DETECTING PHASE DIFFERENCE

[75] Inventors: Masaya Okita, Yokohama; Ryo Uehara, Tokyo, both of Japan

[73] Assignee: Nippon Kogaku K.K., Tokyo, Japan

[21] Appl. No.: 724,521

[22] Filed: Apr. 18, 1985

[30] Foreign Application Priority Data

Apr. 19, 1984 [JP] Japan .................................. 59-77487

[51] Int. Cl.⁴ ............................................ H03D 3/20
[52] U.S. Cl. .................................... 329/110; 329/112; 329/122; 375/83; 375/85; 375/94
[58] Field of Search ................. 329/50, 104, 107, 110, 329/112, 122, 124; 375/80–87, 94, 120

[56] References Cited

U.S. PATENT DOCUMENTS 3,729,684  4/1973  Shuda ................................ 375/82 X

*Primary Examiner*—Eugene R. LaRoche
*Assistant Examiner*—James C. Lee
*Attorney, Agent, or Firm*—Michael N. Meller

[57] ABSTRACT

A circuit for demodulating a modulated signal of date data or the like modulated by PSK or DPSK and recorded on a recording medium along with a still picture signal produced by an electronic still picture camera. The circuit generates a plurality of signals having the same frequency as the PSK or DPSK modulated signal and a predetermined phase difference with respect to each other and one of the signals having the minimum phase difference with respect to the modulated signal is selected thereby PSK or DPSK demodulating the modulated signal in accordance with the selected signal.

6 Claims, 3 Drawing Figures

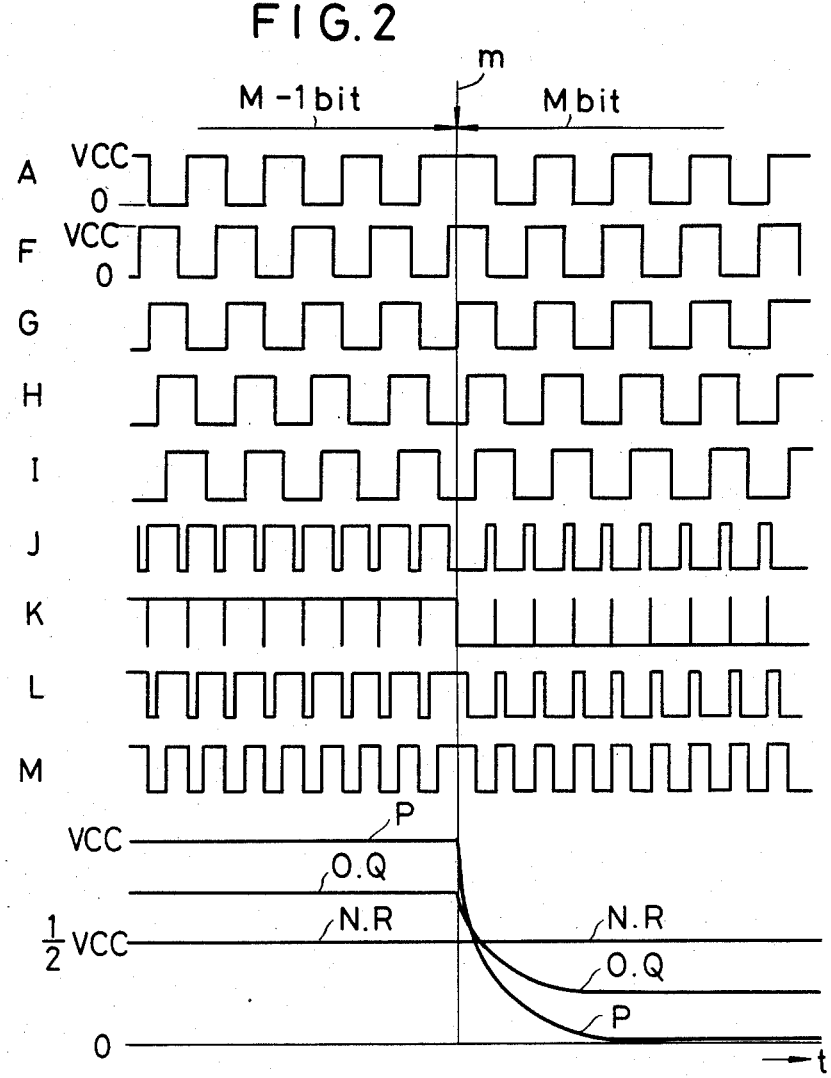
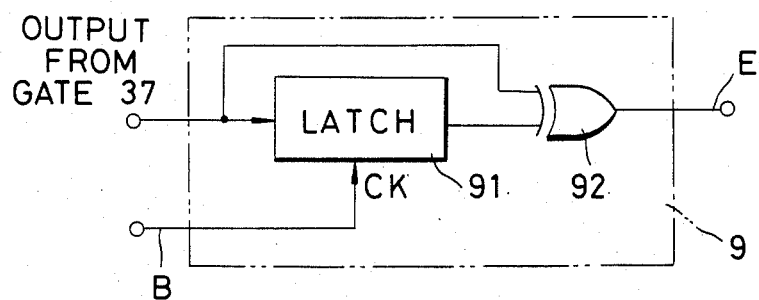

DEMODULATION CIRCUIT HAVING MEANS FOR DETECTING PHASE DIFFERENCE

BACKGROUND OF THE INVENTION

1. Field of the Invention

The present invention relates to a demodulation circuit for signals modulated by the process of phase shift keying (hereinafter referred to as a PSK) or differential phase shift keying (hereinafter referred to as a DPSK).

2. Description of the Prior Art

The PSK and DPSK are modulation systems which belong to the class of continuous wave modulation systems (the continuous wave is hereinafter referred to as a CW) and in accordance with the PSK, during the demodulation the phase of the CW serving as a basis is compared with the phase of the modulated wave so as to discriminate, for example, whether the CW and the modulated signal are in phase or out of phase by 180°. In accordance with the DPSK, if a bit is represented by several or several tens cycles of the CW, during the demodulation the phase of the modulated signal during the preceding bit is compared with the phase of the current modulated signal so as to discriminate whether the two signals are in phase or 180° out of phase with each other.

In other words, with the known apparatus for the PSK or DPSK modulation, it has been important that the circuit for generating a reference signal for phase comparison operates stably and it has been difficult to make the necessary adjustments for the stable operation of the circuit.

Recently, in place of 35-mm film cameras, electronic still picture cameras have come to hold public attention in which a still picture signal corresponding to an image of an object is recorded on a recording medium such as a magnetic disc. With this type of electronic still picture camera, it is conceivable to record a still picture signal corresponding to an object image as well as photographic data such as the date of photographing on a recording medium. In the case of the cameras designed to FM modulate a still picture signal and record it on the medium, it has been proposed to DPSK modulate photographic information and record it on the medium. Thus, with an apparatus for reproducing the information on the medium, an essential matter is whether its DPSK demodulation circuit is readily adjustable, stable in operation and easy to manufacture as an IC.

SUMMARY OF THE INVENTION

It is the primary object of the present invention to provide a PSK or DPSK demodulation circuit which requires no adjustment, is stable in operation and is easy to manufacture as an IC.

To accomplish the above object, in accordance with the present invention there is thus provided a demodulation circuit so constructed that a plurality (e.g., four) of signals having the same frequency with a PSK or DPSK modulated signal and a predetermined phase difference with each other are generated and the desired PSK or DPSK demodulation is made by using one of the plurality of differently phased signals which has the minimum phase difference with respect to the modulated signal.

BRIEF DESCRIPTION OF THE DRAWINGS

FIG. 2 is a time chart for the apparatus of the invention.

FIG. 3 is a block diagram showing the construction of the decoder shown in FIG. 1.

DETAILED DESCRIPTION OF THE PREFERRED EMBODIMENT

Figure 1:
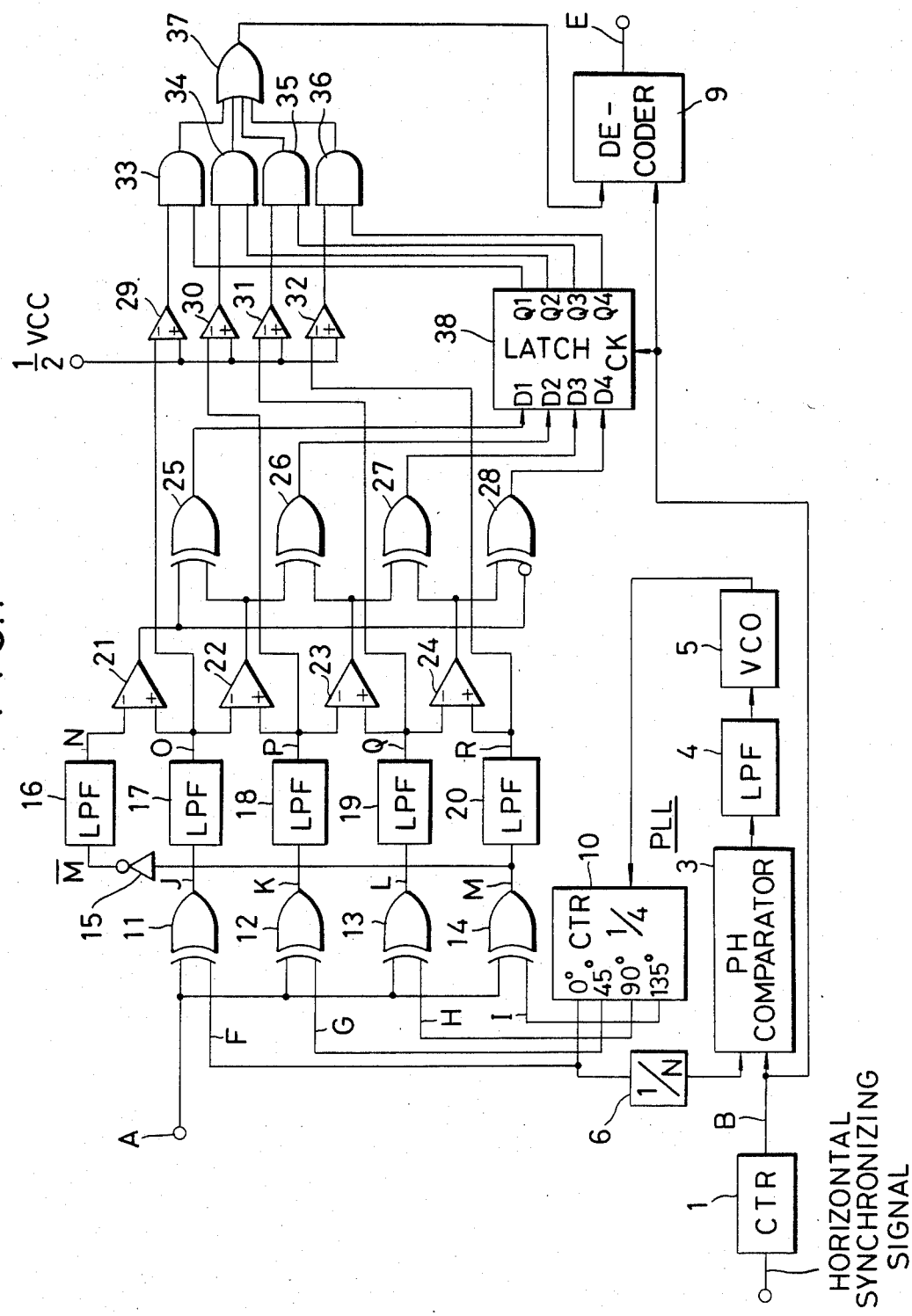
FIG. 1 is a block diagram of an apparatus according to the invention.

FIG. 1 shows an apparatus of the invention applied to a case where, by way of example, an FM modulated still picture signal and a DPSK modulated photographic information signal indicative of photographic information such as date are recorded by multiplex recording on the magnetic disc of an electronic still picture camera and the photographic information signal is reproduced from the magnetic disc. Since the photographic information signal is quite different in frequency from the picture signal, it is separated by a filter which is not shown and then reshaped to a rectangular waveform. A signal A indicates the photographic information signal reshaped to the rectangular waveform. The signal A has a frequency of 13f ($f_H$ represents the frequency of a horizontal synchronizing signal) and after the expiration of a predetermined horizontal synchronizing period from a vertical synchronizing signal of a reproduced picture signal from the magnetic disc, the phase of the signal A is shifted between 0° and 180° and modulated at intervals of a bit with each bit being represented by a predetermined number (n) of horizontal synchronizing signals. A signal B is a pulse signal generated upon every transition between bits, that is, it is generated by a counter 1 which counts the number of horizontal synchronizing signals to generate a pulse when the count reaches n and it is used as a clock pulse for data decoding purposes. The frequency of the signal A is N(=13n) times that of the signal B.

In FIG. 1, a phase comparator 3 receives the signal B from one of its input terminals and a voltage controlled oscillator 5 (hereinafter referred to as a VCO) generates a signal of a frequency proportional to an output voltage of the comparator 3 applied through a low-pass filter 4 (hereinafter referred to as an LPF). A counter 6 divides the signal frequency applied from the VCO 5 by a factor of 4 to generate signals F, G, H and I, and a counter 6 generates the signal F (the phase =0°) after dividing it by N. The phase comparator 3 receives the output of the counter 6 from the other input terminal.

The circuits 3, 4, 5, 10 and 6 form a phase locked loop (hereinafter referred to as a PLL) which provides signal generating means for generating the signals F, G, H and I having the same frequency with the signal A (the PSK or DPSK modulated signal) and different in phase with each other. Here, if the phase of the signal F is 0°, then the phase of the signal G is 45°, the phase of the signal H is 90° and the phase of the signal I is 135° showing the phase difference of 45° with respect to each other. These signals can be easily produced by utilizing the output signal of the VCO 5. Here, the signals F, G, H and I are rectangular waveforms which vary between a voltage Vcc and 0 level. Exclusive OR gates 11 to 14 (hereinafter referred to as EXORs) receive the signal A in common and they also receive respectively the signals F, G, H and I from the counter 10 to generate signals J, K, L and M, respectively. An inverter 15 inverts and applies the signal M to an LPF 16. The LPFs 16 to 20 respectively receive a signal $\overline{M}$ produced from the signal M through the inverter 15 and the signals J, K, L and M to generate signals N, O, P, Q and R. Comparators 21 to 24 respectively compare the signals N and O, the signals O and P, the signals P and Q and the signals Q and R. EXORs 25 to 28 respectively receive the signals from the comparators 21 and 22, the comparators 22 and 23, the comparators 23 and 24 and the comparators 24 and 21 and their output signals are respectively applied to input terminals $D_1$ to $D_4$ of a latch circuit 38. Comparators 29 to 32 respectively compare the signals O, P, Q and R with a reference voltage ($\frac{1}{2}$ Vcc), and AND gates 33 to 36 respectively receive the signals from the comparators 29 to 32 and the signals from $Q_1$ to $Q_4$ terminals of the latch circuit 38. An OR gate 37 receives the outputs of the AND gates 33 to 36 and a decoder 9 decodes the output of the OR gate 37 by using the signal B as a clock.

Here, the EXORs 11 to 14, the LPFs 16 to 20, the comparators 21 to 24 and the EXORs 25 to 28 form a circuit for detecting one of the differently phased signals F, G, H and I which is most suited for demodulation purposes, and the latch circuit 38, the AND gates 33 to 36 and the OR gate 37 form a circuit for selecting the detected signal. Also, the EXORs 11 to 14, the LPFs 17 to 20, the comparators 29 to 32 and the decoder 9 form demodulating means for demodulating the PSK or DPSK modulated signal by using the selected signal.

With the construction described above, the operation of the demodulation circuit will now be described with reference to the operating waveform diagram of FIG. 2 and a Table showing the states of the EXORs 25 to 28.

In FIG. 2, an arrow m indicates the point of transition between an M-1 bit and an M bit.

The EXORs 11 to 14 respectively receive, in addition to the signal A, the signals F, G, H and I which are different in phase by 45° from each other as shown in FIG. 2 and they respectively generate the signals J, K, L and M shown in FIG. 2.

The LPFs 16 to 20 respectively receive the signals $\overline{M}$, J, K, L and M and then they respectively generate the signals N, O, P, Q and R which are varied in signal level in accordance with the duty ratio of their input signals as shown in the lower part of FIG. 2.

In this case, of the signals F, G, H and I generated from the counter 10, G is the signal whose phase difference with respect to the signal A (the PSK or DPSK modulated signal) is closest to 0° or 180° and the duty ratio of the signal K generated through the EXOR 12 is greatest during the M-1 bit and smallest during the M bit. As a result, only the signal P from the LPF 18 receiving the signal K is close to the voltage Vcc during the M-1 bit as shown in FIG. 2 and the signal P becomes close to 0 V during the M bit. Thus, by comparing the output signals of the LPFs 16 to 20 through the comparators 21 to 24, it is possible to detect that one of the signals whose phase difference with respect to the signal A is closest to 0° or 180°.

The following Table shows the states of the outputs from the comparators 21 to 24 and the EXORs 25 to 28 when the LPF output signals 0, P, Q and R are respectively closest to 0 V or the voltage Vcc. In the Table, symbol H represents the signals whose voltages are at the voltage Vcc and L represents the signals whose voltages are at 0 V.

TABLE

| | Compartor | | | | EXOR | | | |
|---|---|---|---|---|---|---|---|---|
| | 21 | 22 | 23 | 24 | 25 | 26 | 27 | 28 |
| Signal O is closest to O V | L | H | H | H | H | L | L | L |
| Signal P is closest to O V | L | L | H | H | L | H | L | L |
| Signal Q is closest to O V | L | L | L | H | L | L | H | L |
| Signal R is closest to O V | L | L | L | L | L | L | L | H |
| Signal O is closest to Vcc | H | L | L | L | H | L | L | L |
| Signal P is closest to Vcc | H | H | L | L | L | H | L | L |
| Signal Q is closest to Vcc | H | H | H | L | L | L | H | L |
| Signal R is closest to Vcc | H | H | H | H | L | L | L | H |

As will be seen from the Table, any one of the EXORs 25 to 28 is always at the H level and therefore it is only necessary to use any one of the LPF output signals Os, P, Q and R corresponding to the H-level EXOR for the purpose of demodulation.

In the embodiment shown in FIG. 1, upon every transition from one bit to another the signals from the EXORs 25 to 28 are latched by means of the latch circuit 38 in response to the signal B so that one of the output signals of the comparators 29 to 32 corresponding to the H-level signal is applied to the data decoder 9 through any one of the AND gates 33 and 36 and through the OR gate 37.

It is to be noted that in this embodiment, for the latch circuit 38 and the decoder 9, upon every transition from one bit to another the outputs of the comparators 29 to 32 are not changed due to the delay of the LPFs 16 to 20 and thus the signal B itself is used for the timing of latching by the latch circuit 38 and the decoder 9. Then, the decoder 9 detects whether the output of the OR gate 37 immediately after the completion of the latching by the latch circuit 38 is changed during the current bit interval, thereby generating a demodulated signal E resulting from the demodulation of the signal A or the DPSK modulated signal.

FIG. 3 shows the construction of the decoder 9 including a latch circuit 91 and an EXOR 92. The latch circuit 91 is responsive to the pulse of the signal B so that the output from the OR gate 37 is latched and applied to the EXOR 92. Thus, the EXOR 92 generates a H-level output when the output of the OR gate 37 changes from the H-level to the L level or vice versa. In this way, the decoder 9 performs the DPSK demodulation.

Also, in FIG. 2, while the latch circuits 38 and 91 cannot latch the signals during the M-1 bit interval by the signal B if the signals O, P and Q are varied below $\frac{1}{2}$ Vcc upon the transition from the M-1 bit to the M bit in FIG. 2, due to the LPFs 17 to 20, there is a time lag until the signals 0, P and Q are varied to $\frac{1}{2}$ Vcc and thus the latch circuits 38 and 91 can latch the signals during the M-1 bit interval in response to the pulse of the signal B. Similarly, upon the transition from one bit to the, next, if any of the signals O, P, Q and R are varied from the higher level to the level lower than $\frac{1}{2}$ Vcc or vice versa, the latch circuits 38 and 91 can latch the signals during the said one bit.

Also, where the signal A is the PSK modulated signal, it is only necessary to construct so that a time sharing is utilized such that the signal A comprises a CW only during the interval of the first bit and also the latch circuit 38 latches only the signals during the first bit.

What is claimed is:

1. A circuit for demodulating a modulated signal of a predetermined frequency recorded, along with a still picture signal produced by an electronic still picture camera, on a recording medium, said modulated signal being modulated by a phase shift keying or differential phase shift keying, said circuit comprising:

(a) production means for producing a plurality of signals having said predetermined frequency and different in phase from each other;

(b) selecting means for selecting one of said plurality of signals from said production means; and (c) demodulating means for demodulating said modulated signal in accordance with said signal selected by said selecting means; wherein said demodulating means includes means for generating a signal at intervals of a predetermined period and means for detecting a difference between the phase of said modulated signal before and after the generation of said periodic signal from said generating means.

2. A circuit for demodulating a modulated signal of a predetermined frequency recorded, along with a still picture signal produced by an electronic still picture camera, on a recording medium, said modulated signal being modulated by a phase shift keying or differential phase shift keying, said circuit comprising:

(a) production means for producing a plurality of signals having said predetermined frequency and different in phase from each other;

(b) selecting means for selecting one of said plurality of signals from said production means; and (c) demodulating means for demodulating said modulated signal in accordance with said signal selected by said selecting means;

wherein said selecting means includes detecting means for detecting a phase difference of each of the plurality of signals from said production means with respect to said modulated signal, and means for selecting one of said plurality of signals whose phase difference detected by said detecting means with respect to said modulated signal is closest to a predetermined phase difference.

3. A circuit for demodulating a data signal modulated by a phase shift keying or differential phase shift keying in accordance with a signal of a predetermined frequency, said circuit comprising:

(a) production means for producing a plurality of signals having said predetermined frequency and different in phase from each other;

(b) selecting means for selecting one of said plurality of signals from said production means; and (c) demodulating means for demodulating said modulated signal in accordance with said signal selected by said selecting means;

4. A circuit according to claim 3, wherein said selecting means further includes signal detecting means responsive to said phase difference signals to detect one of the plurality of signals from said production means whose phase difference detected by said phase difference detecting means is closest to a predetermined phase difference.

5. A circuit according to claim 4, further comprising means for generating a pulse at intervals of a predetermined period.

6. A circuit according to claim 5, wherein said demodulating means includes means for comparing a phase difference between said signal detected by said signal detecting means and said modulated signal after the generation of a given pulse from said pulse generating means and a phase difference between said signal detected by said signal detecting means and said modulated signal before the generation of said given pulse from said pulse generating means.

* * * * *